(12) United States Patent
Pomerantz (10) Patent No.: US 7,930,853 B2
(45) Date of Patent: Apr. 26, 2011

(54) HUMANE ANIMAL TRAP

(75) Inventor: Joseph L. Pomerantz, Moorpark, CA (US)

(73) Assignee: Advantek Marketing, Inc., Moorpark, CA (US)

( * ) Notice: Subject to any disclaimer, the term of this patent is extended or adjusted under 35 U.S.C. 154(b) by 677 days.

(21) Appl. No.: 12/034,464

(22) Filed: Feb. 20, 2008

(65) Prior Publication Data

US 2009/0205244 A1 Aug. 20, 2009

(51) Int. Cl.
*A01M 23/00* (2006.01)
(52) U.S. Cl. .............................. 43/61; 43/60
(58) Field of Classification Search ................ 43/60, 65, 43/61, 67, 58
See application file for complete search history.

(56) References Cited

U.S. PATENT DOCUMENTS

| | | | |
|---|---|---|---|
| 6,202,340 B1 * | 3/2001 | Nieves | 43/61 |
| 6,609,327 B2 * | 8/2003 | Stoico et al. | 43/61 |
| 7,051,472 B1 * | 5/2006 | Kelly | 43/61 |
| 7,540,109 B2 * | 6/2009 | Hall | 43/61 |

* cited by examiner

*Primary Examiner* — Joshua J Michener
(74) *Attorney, Agent, or Firm* — Haynes & Boone, LLP.

(57) ABSTRACT

A humane animal trap includes an enclosure having an opening with a door disposed therein. The door is pivotable about an upper edge between open and closed positions, and is biased toward the closed position by a torsion spring. An electrical solenoid is disposed above the door and has a catch that is biased into engagement with a holding feature on the door when the door is in the open position, and is operable to disengage the catch from the holding feature in response to the receipt of an electrical trip signal. An electrical sensor disposed in the enclosure transmits a light beam between opposite sidewalls of the trap, and generates an electrical trip signal and transmits it to the solenoid when the light beam is interrupted by an animal entering the trap so as to close the door behind the animal and thereby capture it unharmed in the enclosure.

20 Claims, 7 Drawing Sheets

HUMANE ANIMAL TRAP

TECHNICAL FIELD

This disclosure relates to traps for animals, in general, and in particular, to "humane," or "catch-and-release" animal traps for small to medium sized animals that is actuated by an infrared (IR) or other light-sensing sensor mechanisms.

RELATED ART

Since prehistoric times, man has sought through a variety of devices, such as snares, springes, dead-falls, and the like, to capture a wide variety of wild or feral animals for a wide variety of reasons, including for food, fur or feathers for clothing, for breeding stock, disease control or to eliminate predation of crops or livestock.

Typically, the traps were of a type that inflicted pain or even death on the animals falling prey to them. More recently, however, in response to concerns for, among others, the preservation of wildlife and natural resources, a variety of so-called "humane," "live" or "catch-and-release" animal traps have been developed that have as an object the capture of various types of animals, typically quadrupedal, without harming or killing them, with a view to releasing the trapped animals later at another location where, for example, they are no longer a nuisance, or at which it is desirable to establish or reestablish a population of that species of animal.

Humane traps typically include an open-ended enclosure, usually of wire mesh, having an internal arrangement for holding a type of bait that is selected to lure a particular type of target animals into the enclosure, and at least one entry door that can be set in an open position to enable the animal to enter the enclosure so as to approach the bait, and a "trip," or "trigger" mechanism, typically operated by the touch or weight of the animal, that causes the entry door to close rapidly behind the animal by means of gravity or the bias of a spring, and thereby trap the animal in the enclosure. The trap may include a second door through which the animal may be induced to exit the enclosure for release.

The trip mechanism of the trap may be entirely mechanical in nature, such as those described in, e.g., U.S. Pat. No. 7,134,237 to B. Plucknett; U.S. Pat. No. 6,684,560 to D. Lafforthun; and, U.S. Pat. No. 6,609,327 to K. Stoico et al. Alternatively, the trip mechanisms may be entirely electrical in nature, such as described in, e.g., U.S. Pat. No. 6,807,767 to J. Schade; U.S. Pat. No. 6,202,340 to J. Nieves; and, U.S. Pat. No. 6,016,623 to W. Celestine, and may include multiple trip sensor types, such as described in U.S. Pat. No. 7,051,472 to J. Kelly.

While mechanical trip mechanisms have the advantage of being relatively inexpensive and simple to make and use, they are subject to wear and corrosion from exposure to the elements, which can adversely affect their sensitivity and/or speed of operation, and hence, reliability. On the other hand, while electrically actuated trip mechanisms are typically more sensitive and faster in operation, they may also be more expensive and complex to implement reliably in an animal trap that may be subject to rugged outdoor environments.

What is needed then is a humane animal trap that combines the advantages of mechanical and electrical trip mechanisms, and that is also light in weight, inexpensive to fabricate, simple to set and use, and sufficiently robust to withstand long term use in rugged outdoor environments.

SUMMARY

In accordance with the present disclosure, a novel humane animal trap for small to medium sized animals is provided that incorporates an infrared (IR) light trip sensor mechanism operating in conjunction with a mechanical spring-biased entry door, and which is light in weight, inexpensive to fabricate, simple to set and use, and sufficiently robust to withstand extended use in rugged outdoor environments.

In one exemplary embodiment, the humane animal trap comprises an elongated enclosure having an entry opening at a front end thereof. An entry door is disposed within the entry opening and pivotable about an upper edge thereof between an entry closed position, in which the entry opening is blocked or closed, and an entry open position disposed above and spaced apart from a floor of the enclosure such that the trap is open to the entry of a target animal therein. A mechanical spring biases the entry door toward the closed position, and is further operable to lock the entry door in the closed position and against the escape of the trapped animal until intentionally released by the user.

An electrical solenoid is disposed in the enclosure above the entry door. The solenoid has a moveable shaft with a catch disposed thereon that is normally biased into engagement with a holding feature disposed on the entry door when the door is disposed in the open position so as to hold the door in the open position. The solenoid is operable to disengage the catch from the holding feature in response to the receipt of an electrical trip signal so as to release the door from the open position.

A sensor is disposed in the enclosure for sensing the presence of an animal in the enclosure, and comprises a light emitter and receiver disposed in a first side of the enclosure and a light reflector disposed in a second side of the enclosure opposite to the light emitter and receiver. The sensor is operable to establish a beam of light, e.g., infrared (IR) light, between the light emitter, reflector and receiver, and to generate and transmit an electrical trip signal to the solenoid when the light beam is interrupted by an animal entering the trap, so that the entry door quickly closes behind the animal and traps it in the enclosure. The trap also includes an electrical power supply, which may comprise a rechargeable battery disposed in the enclosure.

A better understanding of the above and many other features and advantages of the novel animal trap of the present disclosure can be obtained from a consideration of the detailed description of an exemplary embodiment thereof below, particular if such consideration is made in conjunction with the appended drawings, wherein like reference numbers are used to refer to like elements in the respective figures thereof.

DETAILED DESCRIPTION

Figure 1:
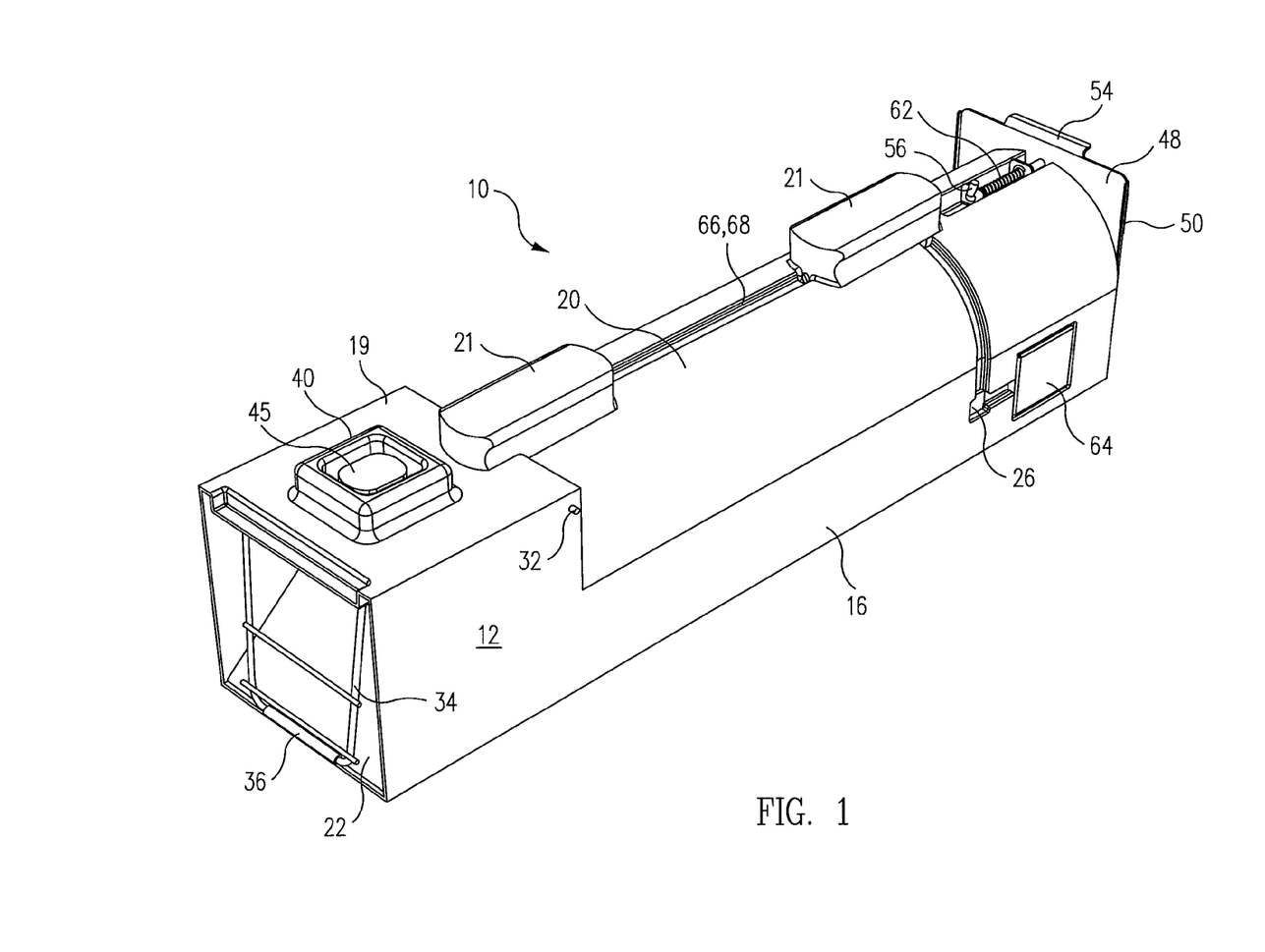
FIG. 1 is an upper front and right side perspective view of an exemplary embodiment of a humane animal trap in accordance with the present disclosure.
Figure 2:
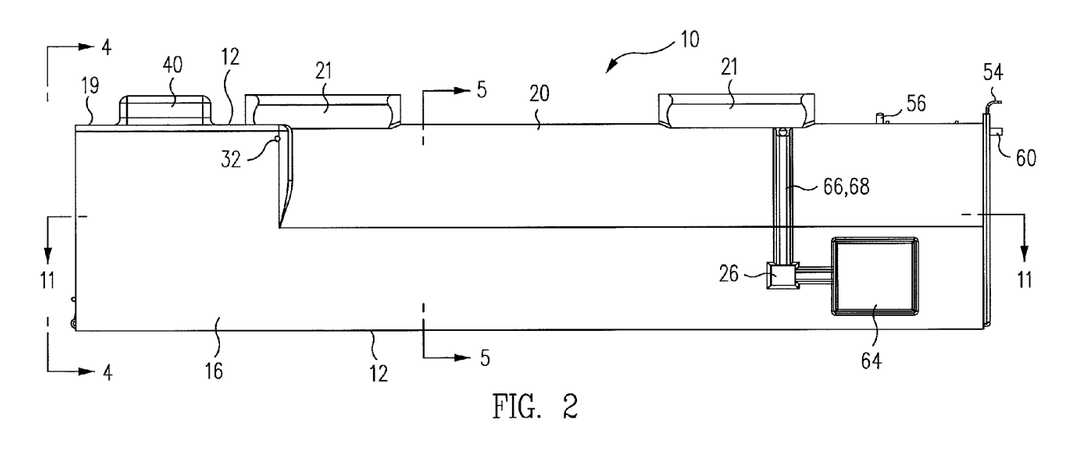
FIG. 2 is a right side elevation view of the exemplary animal trap.

An exemplary embodiment of a humane, or "live," animal trap 10 in accordance with the present disclosure is illustrated in the upper front and right side perspective view of FIG. 1. As illustrated in the several views of the figures, the exemplary animal trap 10 comprises an elongated enclosure 12 having a generally rectangular cross-section, front and rear ends, a generally flat floor 14 (see, e.g., FIG. 3), upstanding and generally parallel right and left sidewalls 16 and 18 (see, e.g., FIG. 11), a top wall comprising flat and arcuate portions 19 and 20, a pair of carrying handles 21, an entry opening 22 located at the front end thereof, and an exit opening 24 (see, e.g., FIG. 13) located at the rear end thereof.

In contrast to trap enclosures of the prior art, which typically incorporate a wire mesh construction, the enclosure 12 of the exemplary trap 12 comprises a molded plastic, e.g., polypropylene, for lower weight and a rugged resistance to corrosion resulting from extended exposure to the elements. For relatively small traps 10, the enclosure can be injection- or blow-molded as a single piece, or in the case of relatively large traps, in parts, e.g., halves, that are then assembled together with fasteners and/or adhesive bonding. An additional advantage of a molded plastic enclosure 12 is that handles 21 and features adapted for retaining certain electrical components of the trap 10 on an external surface of the enclosure can be easily formed in the enclosure during the molding operation, as described in more detail below.

In an alternative, more robust embodiment, the enclosure 12 may comprise a fiber, e.g., fiberglass, reinforced epoxy resin that is laid up in the form of partially cured sections or panels in a set of conformal molds and then assembled together during the final curing of the resin.

Figure 3:
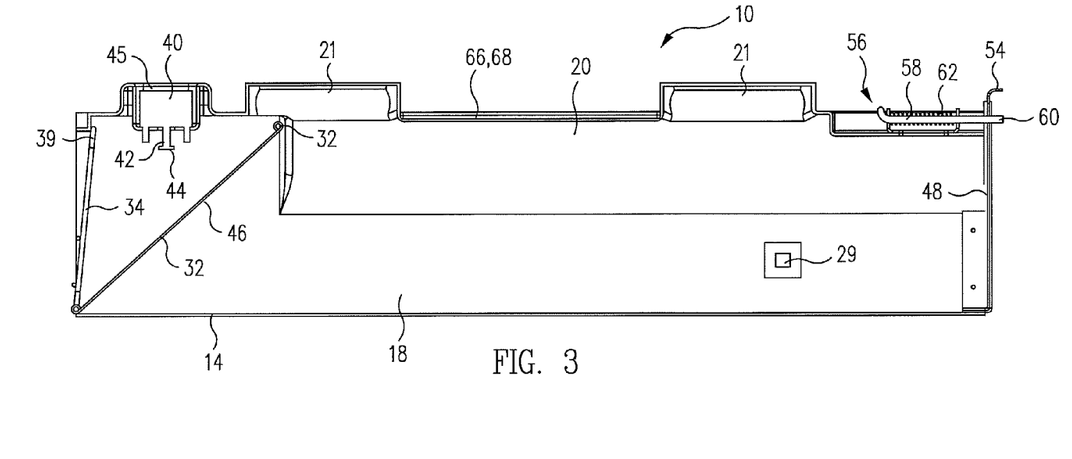
FIG. 3 is a right side cross-sectional view of the trap, showing an entry door and an exit door thereof respectively disposed in closed and locked or latched positions.
Figure 5:
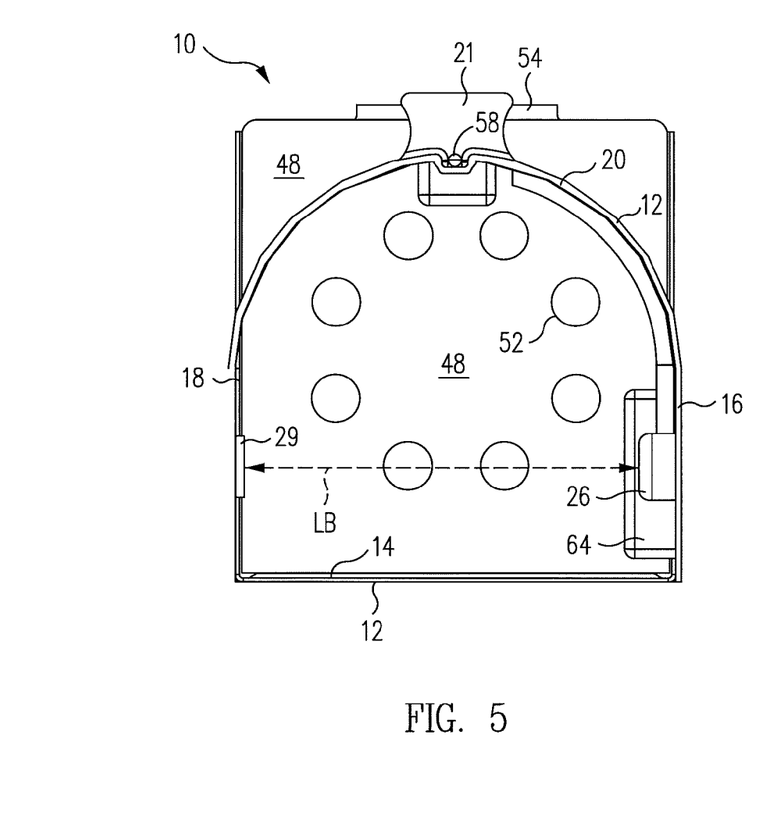
FIG. 5 is a cross-sectional view of the trap, as seen along the lines of the section 5-5 taken in FIG. 2, showing the exit door disposed in the closed and latched position.
Figure 6:
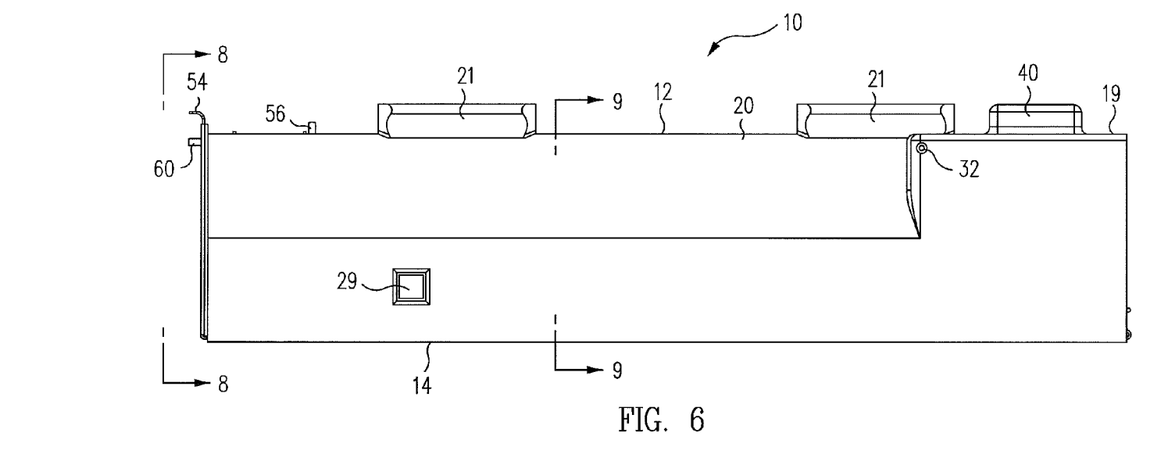
FIG. 6 is a left side elevation view of the trap.
Figure 7:
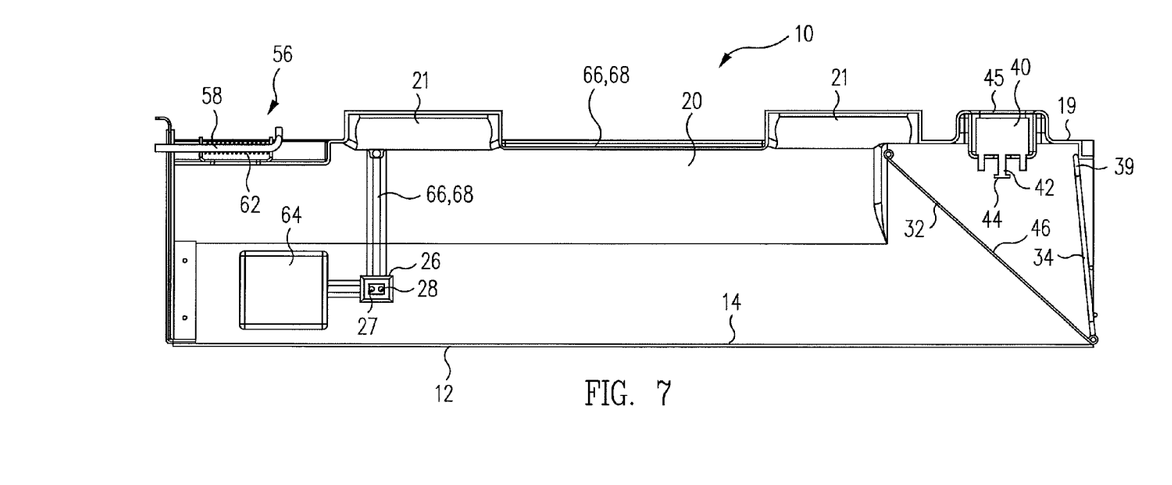
FIG. 7 is a left side cross-sectional view of the trap, showing the entry and exit doors respectively disposed in the closed and locked or latched positions.
Figure 11:
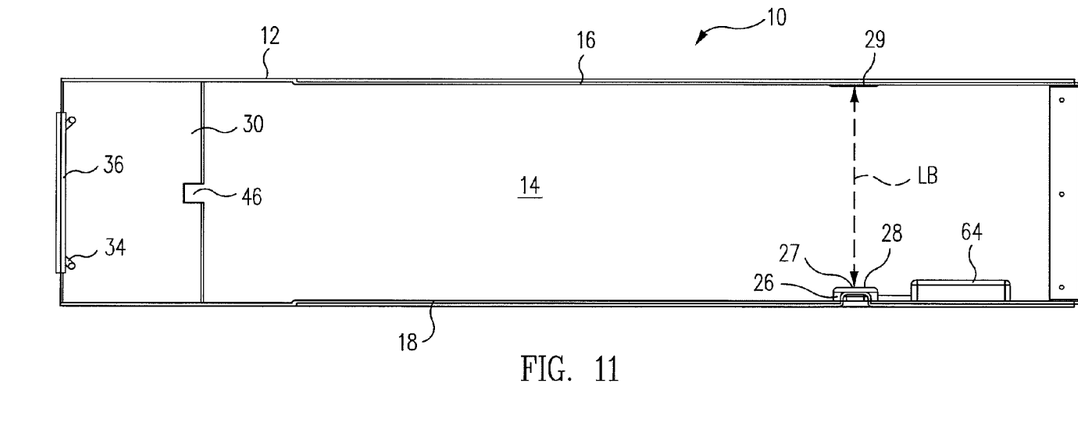
FIG. 11 is a top plan cross-sectional view of the trap, as seen along the lines of the section 11-11 taken in FIG. 2.

As illustrated in, e.g., the cross-sectional views of FIGS. 3, 5 and 7, a electronic sensor 26 is disposed in a rear end portion of the enclosure 12. The sensor 26 comprises three parts, viz., a light emitter 27 and a light receiver 28 disposed adjacent to each other in one side, e.g., the right side 16, of the enclosure 12, and a light reflector 29, for example, a mirror, disposed in the opposite side of the enclosure, e.g., the left side 18 thereof. As illustrated in FIGS. 5 and 11, when activated, i.e., when the trap 10 is "set," the sensor 26 radiates a beam of light LB from the light emitter 27 to the reflector 29, which reflects the light beam back to the receiver 28. When the light beam LB is interrupted, for example, by an animal entering the trap, the sensor generates an electrical "trip" signal and transmits it to an electrical solenoid 40 of the trap described in more detail below.

In an alternative embodiment, the reflector 29 can be omitted and the light emitter 27 and receiver 28 can be disposed in facing opposition to each other on opposite sides of the enclosure 12 so as to establish the interruptible light beam LB across the interior of the enclosure.

In one exemplary embodiment, the light radiated by the sensor 26 may comprise infrared (IR) light, which is invisible to most quadrupedal animals. For simplicity and low cost, the light emitter 27 may comprises a light emitting diode (LED), or a laser diode, and the light receiver 28 may comprises a photodiode.

As illustrated in FIGS. 3 and 5, the light emitter and receiver 26 and the reflector 29 are located toward the rear end portion of the enclosure 12 so as to enable a target animal (not illustrated) to enter into the trap 10 completely before the sensor 26 is tripped or "triggered." The animal may be lured into the entry opening 22 of the trap 10 and toward the rear end thereof by an appropriate type of bait disposed in a holder (not illustrated) placed at the rear end of the trap.

Figure 4:
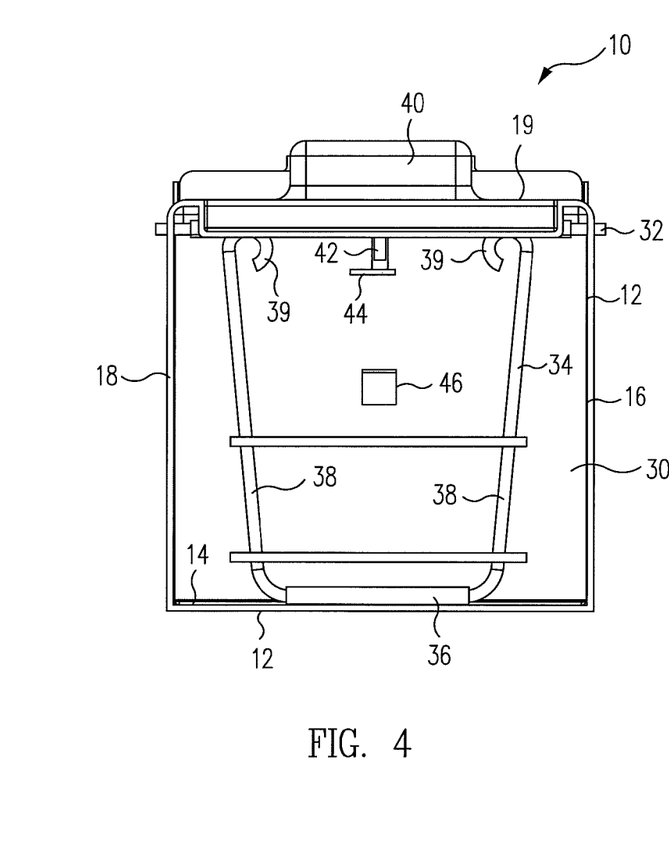
FIG. 4 is a front elevation view of the trap, as seen along the lines of the section 4-4 taken in FIG. 2, showing the entry door disposed in the closed and locked position.
Figure 12:
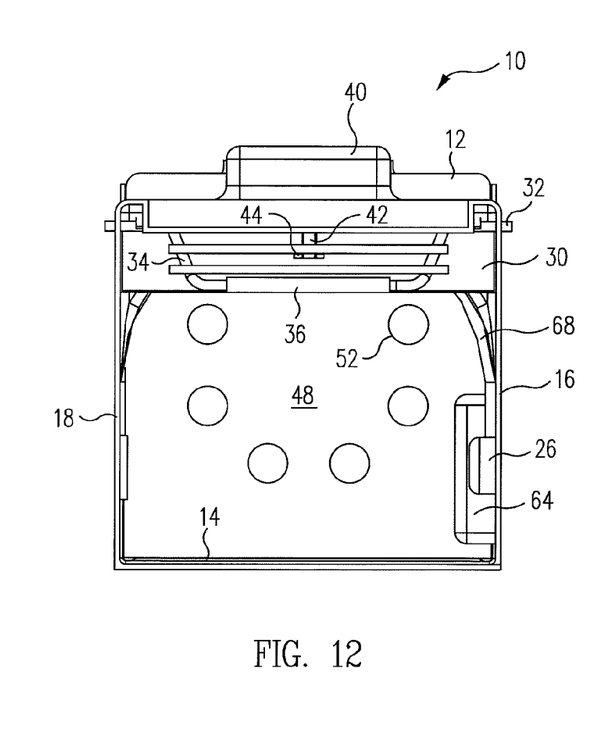
FIG. 12 is a front elevation view of the trap, showing the entry door disposed in an open, or "set" position; and, FIG. 13 is a rear elevation view of trap, showing the exit door disposed in an open position.

As illustrated in FIGS. 1, 3, 4 and 12, a generally rectangular entry door 30 is disposed within the entry opening 22 of the enclosure 12. The entry door 30 is pinioned to the enclosure by means of a rod 32 attached to an upper edge thereof so as to pivot about the upper edge between an "entry closed" position, as illustrated in FIG. 4, in which a lower edge of the door is disposed in forceful contact with the floor 14 of the enclosure 12, whereby the door completely blocks the entry opening 22, and an "entry open" position, as illustrated in FIG. 12, in which the door is disposed above and spaced apart from the floor of the enclosure.

A mechanical spring 34 is used to bias the entry door 30 toward the closed position illustrated in FIG. 4. In the particular exemplary embodiment illustrated in the figures, the spring 34 comprises a U-shaped torsion spring having a first arm 36 fixed to a lower edge of the entry door 30 and a pair of second arms 38, each having an arcuate upper end 39 disposed in sliding contact with the "ceiling," i.e., the lower surface of the flat portion 19 of the top wall of the enclosure 12. The spring 34 is arranged so as to bias the entry door 30 to the closed position and to lock it in that position by a wedging action by pressing against ceiling of the enclosure so as to prevent the escape of an animal from the trap 10. The entry door 30 is "unlocked" from the closed position by pressing rearwardly on the upper ends 39 of the arms 38 of the spring 34 to enable the door 30 to pivot to the open position illustrated in FIG. 12. As those of skill in the art will appreciate, although a torsional spring 34 is shown and described as the entry door 30 biasing mechanism of the exemplary embodiment 10, other types of door closing and locking mechanisms may be used in its stead.

As illustrated in the cross-sectional views of FIGS. 3 and 7, an electrical transducer, e.g., an electrical solenoid 40 is disposed in the flat portion 19 of the top wall of the enclosure 12 above the entry door 30. The solenoid has a moveable, e.g., rotating shaft 42 with an off-center catch 44 disposed at the lower end thereof that is normally biased into engagement with a holding feature 46 disposed on the entry door 30 when the door is disposed in the open position, as illustrated in FIG. 4, and is operable to rotate the shaft and thereby disengage the catch 44 from the holding feature 46 in response to the receipt of an electrical trip signal from the sensor mechanism 26 described above.

In the particular exemplary embodiment illustrated in the figures, the holding feature of the entry door 30 comprises a simple rectangular aperture 46 formed in the center of the door. Thus, as illustrated in FIG. 12, in the open position of the entry door 30, the solenoid shaft 42 and catch 44 extend through the aperture 46, and the catch engages the front surface of the door to prevent its closing. When a trip signal is received from the animal presence sensor 26, the solenoid 40 rotates the shaft 42 and catch 44 in the aperture 46 such that the catch rotates out of engagement with the door front surface, allowing the door to close rapidly in response to the urging of the torsional spring 34.

To "set," or "arm," the entry door 30 of the trap 10, the upper ends 39 of the arms 38 of the spring 34 are pressed rearwardly to unlock the door, as described above, and the door is then raised toward its open or "set" position, illustrated in FIG. 12. As the door approaches the catch 44 of the solenoid 40, a solenoid manual actuation button 45 located on the top of the solenoid is depressed, which causes the catch 44 to rotate to the disengaged position relative to the aperture 46. When the entry door 30 is then further raised above the level of the catch such that the catch and shaft extend through the door holding aperture 46, the solenoid manual actuation button is released, which allows the catch to rotate back to the door-engaging position. The trap 10 is then set to trap any animal that enters into the trap and interrupts the light beam LB of the animal sensor 26 located toward the rear end thereof, as described above. As those of skill in the art will appreciate, other mechanisms by which the solenoid 40 engages the entry door 30 against and releases it in favor of the biasing spring 34 can be implemented, and accordingly, the particular trip mechanism described and illustrated herein should be understood as being only exemplary thereof, and not in any limiting sense.

Figure 8:
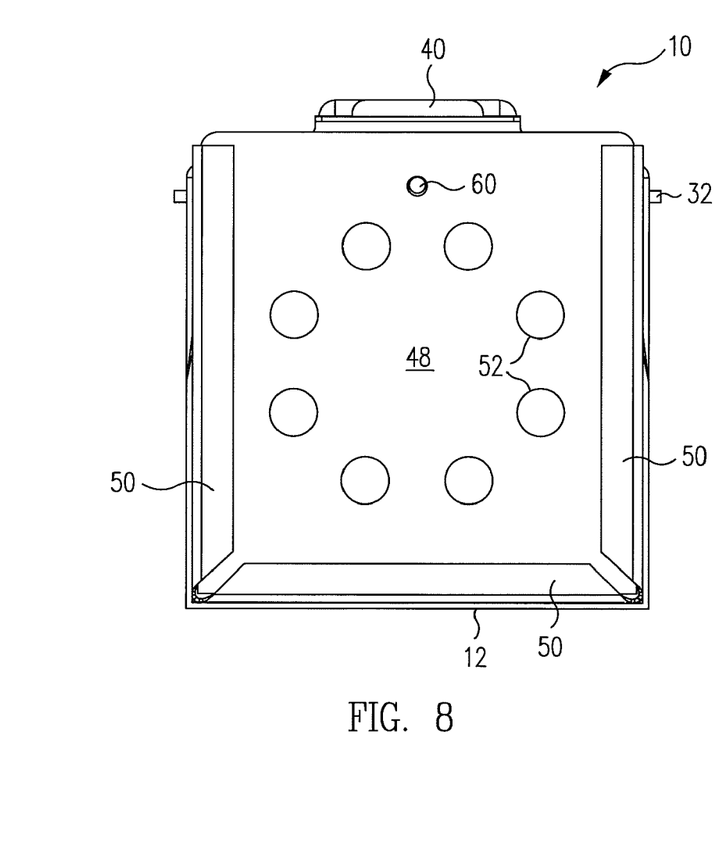
FIG. 8 is a rear elevation view of the trap, as seen along the lines of the section 8-8 taken in FIG. 6, showing the exit door disposed in the closed and latched position.
Figure 9:
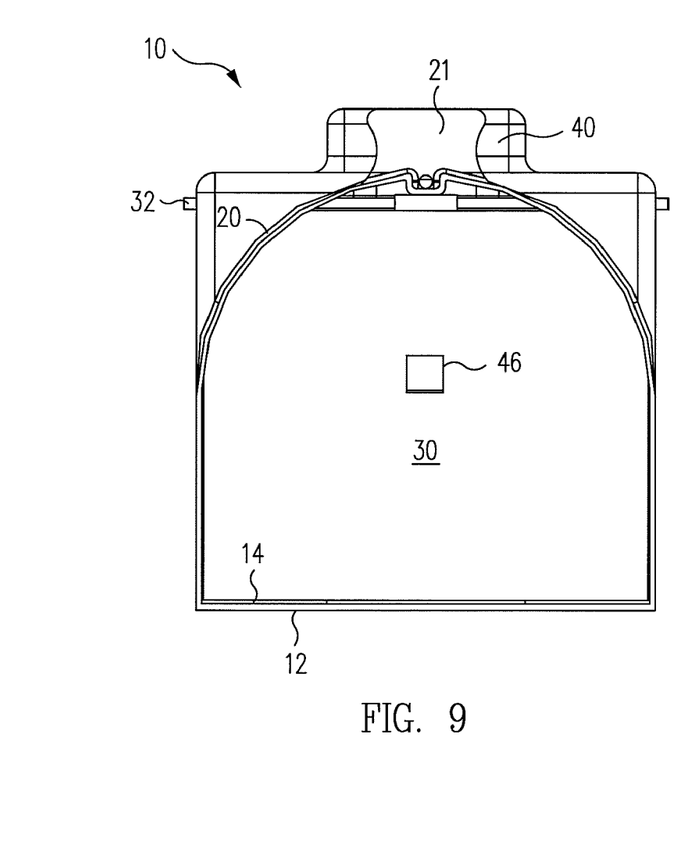
FIG. 9 is a cross-sectional view of the trap, as seen along the lines of the section 9-9 taken in FIG. 6, showing the entry door disposed in the closed and locked position.
Figure 10:
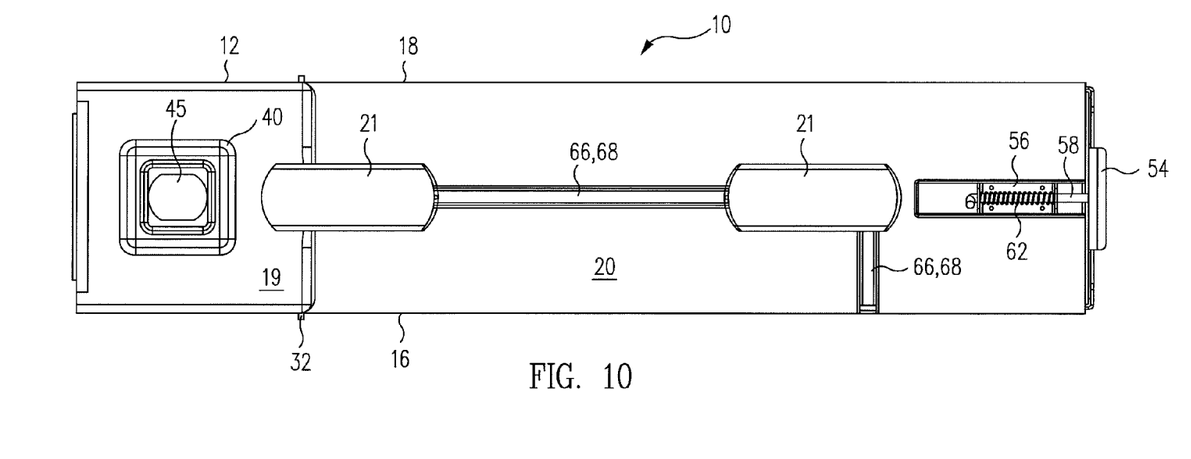
FIG. 10 is a top plan view of the trap.
Figure 13:
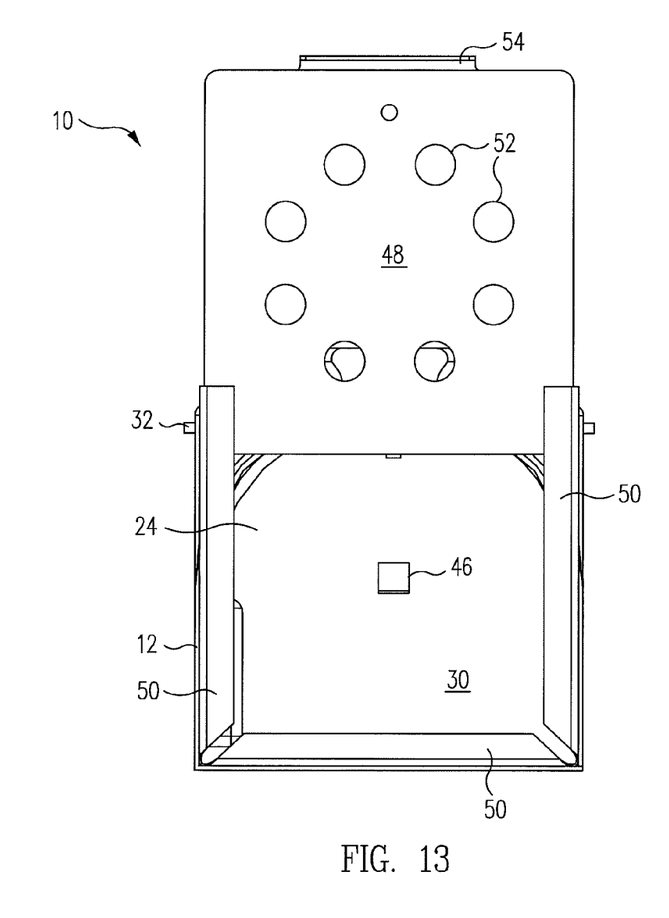

As illustrated in, e.g., FIGS. 8 and 13, the exemplary enclosure 12 further includes a planar, generally rectangular exit door 48 that is slidably disposed between the end of the enclosure and a plurality of right-angled flanges 50 located at the rear end of the enclosure 12, and is movable up and down between an "exit closed" position, as illustrated in FIG. 8, in which the exit door 48 blocks the exit opening 24 at the rear end of the enclosure 12, and an "exit open" position, illustrated in FIG. 13, which renders the exit opening of the enclosure wide open, to permit an animal contained in the trap to be easily released therefrom, for example, into a holding pen, a cage, or a loading chute. The exit door 48 may include a plurality of openings 52 to provide trap ventilation and a gripping flange 54 disposed at an upper end thereof to enable the door to be easily gripped with the fingers for raising and lowering of the door.

The trap 10 may further comprise a simple but effective latching mechanism 56 disposed on the enclosure 12 and adapted to latch the exit door 48 in the closed position to prevent the escape of an animal from the trap. As illustrated in, e.g., FIGS. 3 and 7, the exit door latching mechanism 56 may comprise an elongated rod 58 disposed on the enclosure for sliding movement between a latched position, in which an end 60 of the rod is engaged in a corresponding latch aperture in the exit door 48, and an unlatched position, in which the end of the rod is disengaged from the exit door latch aperture, and a coiled spring 62 that biases the end 60 of the rod toward the exit door latch aperture.

As will be appreciated, the trap 10 necessarily includes an electrical power supply 64 disposed in the enclosure 12 adjacent to the sensor apparatus 26 for powering both the sensor and the solenoid 40. Since the trap 10 is adapted for use in remote areas, the power supply preferably comprises a battery, or "battery pack," adapted specifically to the electrical requirements of the trap in terms of voltage, current and battery life. Preferably, the battery 64 is rechargeable, so that the user can exchange freshly charged batteries for exhausted batteries in the field, and return home with the exhausted batteries for recharging, so that the trap can remain in continuous service.

In the exemplary trap 10, a plurality of electrical conductors 66, e.g., wires, are provided to interconnect the electrical power source 64, the light emitter 27 and receiver 29, and the electrical solenoid 40 electrically, for the transmission of power and trip signals therebetween. As discussed above, since the enclosure 12 is of a molded construction, a U-shaped channel 68 may be easily be provided in the outer surface of the enclosure 12 at the time of manufacture and used to route the electrical conductors between the foregoing electrical components.

Thus, in the particular exemplary embodiment illustrated in the figures, the electrical conductors 66 are disposed in a U-shaped channel 68 that is formed in the exterior surface of the enclosure and extends between the power supply 64, the light emitter 27 and receiver 28 of the animal sensor 26, and the electrical solenoid 40. By routing the wiring in the exterior channel 68, the wiring is protected against damage caused by an animal captured in the trap, as well as from abrasion or damage caused by sharp and/or abrasive objects coming into contact with the exterior surface of the trap. For additional protection against damage and the elements, the electrical conductors 66 may be configured in the form of a relatively flat, flexible printed circuit film that is adhered to the bottom surface of the U-shaped channel 68.

As those of skill in this art will by now appreciate, many modifications, substitutions and variations can be made in the applications, materials and methods of implementation of the novel humane animal trap of the present disclosure without departing from its spirit and scope. In light of this, the scope of the present disclosure should not be limited to that of the particular embodiments illustrated and described herein, as they are only by way of some examples thereof, but instead, should be fully commensurate with that of the claims appended hereafter and their functional equivalents.

What is claimed is:

1. A humane animal trap, comprising:
    an elongated enclosure having an entry opening at a front end thereof;
    an entry door disposed within the entry opening and pivotable about an upper edge thereof between an entry closed position blocking the entry opening and an entry open position disposed above and spaced apart from a floor of the enclosure;
    a spring biasing the entry door toward the closed position;
    an electrical transducer disposed in the enclosure above the entry door, the transducer having a catch that is normally biased into engagement with a holding feature disposed on the entry door when the door is disposed in the open position, and being operable to disengage the catch from the holding feature in response to the receipt of an electrical trip signal;
    an animal sensor disposed in the enclosure, the sensor comprising a light emitter and receiver operable to establish a beam of light (LB) extending across the interior of the enclosure and to generate and transmit an electrical trip signal to the transducer when the light beam is interrupted by an animal entering the trap; and,
    an electrical power supply.

2. The trap of claim 1, wherein the enclosure includes an exit opening at a rear end thereof, and further comprising an exit door slidably disposed at the rear end of the enclosure and movable between an exit open position and an exit closed position blocking the exit opening.

3. The trap of claim 2, further comprising a latching mechanism disposed on the enclosure and adapted to latch the exit door in the closed position.

4. The trap of claim 3, wherein the latching mechanism comprises:
   an elongated rod disposed on the enclosure for sliding movement between a latched position, in which an end of the rod engages in a latch aperture in the exit door, and an unlatched position, in which the end of the rod is disengaged from the exit door latch aperture; and,
   a spring biasing the rod toward the exit door latch aperture.

5. The trap of claim 1, wherein the enclosure comprises a plastic material.

6. The trap of claim 5, wherein the plastic material comprises polypropylene.

7. The trap of claim 1, wherein the enclosure includes a U-shaped channel extending from the electrical power supply to the light emitter and receiver, and thence, to the electrical solenoid, and further comprising a plurality of electrical conductors extending through the U-shaped channel and interconnecting the electrical power source, the light emitter and receiver, and the electrical solenoid.

8. The trap of claim 7, wherein the electrical conductors comprise a flexible printed circuit board disposed within the U-shaped channel.

9. The trap of claim 1, wherein the spring comprises a U-shaped torsion spring having a first arm fixed to a lower edge of the entry door and a pair of second arms, each having an upper end in sliding engagement with a ceiling of the enclosure, and being arranged to bias the entry door toward and lock it in the closed position.

10. The trap of claim 1, wherein the entry door holding feature comprises an aperture disposed in the door.

11. The trap of claim 1, wherein the light comprises infrared (IR) light.

12. The trap of claim 1, wherein the light emitter comprises a light emitting diode (LED).

13. The trap of claim 1, wherein the light receiver comprises a photodiode.

14. The trap of claim 1, wherein the electrical power supply comprises a battery disposed in the enclosure.

15. The trap of claim 14, wherein the battery comprises a rechargeable battery.

16. The trap of claim 1, wherein the animal sensor is located in a rear end portion of the enclosure.

17. A humane animal trap, comprising:
   an elongated enclosure having front and rear ends, a floor, upstanding and generally parallel sidewalls, a top wall having an arcuate portion and a flat portion, at least one carrying handle, an entry opening located at the front end thereof and an exit opening located at the rear end thereof;
   a sensor disposed in a rear end portion of the enclosure, the sensor comprising an infrared (IR) light emitter and receiver disposed in a first side of the enclosure and a light reflector disposed in a second side of the enclosure opposite to the light emitter and receiver, the sensor being operable to radiate a beam of IR light from the light emitter to the reflector and back to the receiver, and to generate and transmit an electrical trip signal when the light beam is interrupted;
   an entry door disposed within the entry opening of the enclosure and moveable between an entry open position and an entry closed position blocking the entry opening;
   a spring biasing the entry door toward the closed position;
   an electrical solenoid disposed in the enclosure and adjacent the entry door, the solenoid having a shaft with a catch thereon that is normally biased into engagement with a holding feature disposed on the entry door when the door is disposed in the open position so as to hold the entry door in the open position, and being operable to disengage the catch from the holding feature in response to the receipt of the electrical trip signal from the sensor so as to release the entry door from the open position;
   an exit door disposed within the exit opening of the enclosure and movable between an open position and a closed position blocking the exit opening;
   a latching mechanism disposed on the enclosure and adapted to latch the exit door in the closed position;
   an electrical power supply disposed in the enclosure; and,
   a plurality of electrical conductors interconnecting the electrical power source, the light emitter and receiver, and the electrical solenoid.

18. The trap of claim 17, wherein the enclosure comprises a molded plastic.

19. The trap of claim 17, wherein the light emitter comprises a light emitting or a laser diode.

20. The trap of claim 17, wherein the electrical conductors are disposed in a U-shaped channel formed in an exterior surface of the enclosure and extending between the power supply, the sensor and the electrical solenoid.

* * * * *